(12) United States Patent
Kishida et al.

(10) Patent No.: US 8,160,440 B2
(45) Date of Patent: Apr. 17, 2012

(54) THREE-DIMENSIONAL IMAGE PICKUP APPARATUS AND THREE-DIMENSIONAL IMAGE PICKUP METHOD

(75) Inventors: Yuki Kishida, Osaka (JP); Takashi Kokuwa, Osaka (JP); Hiroyuki Makuta, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/020,893

(22) Filed: Feb. 4, 2011

(65) Prior Publication Data

US 2012/0027392 A1 Feb. 2, 2012

(30) Foreign Application Priority Data

Jul. 28, 2010 (JP) ................... 2010-168898

(51) Int. Cl.
*G03B 35/00* (2006.01)
*H04N 15/00* (2006.01)
(52) U.S. Cl. .................... 396/324; 396/325; 348/47
(58) Field of Classification Search .............. 396/324, 396/325; 348/47
See application file for complete search history.

(56) References Cited

U.S. PATENT DOCUMENTS

| 3,818,125 | A | * | 6/1974 | Butterfield | 348/49 |
| 3,959,580 | A | * | 5/1976 | Chocol et al. | 348/42 |
| 4,751,570 | A | * | 6/1988 | Robinson | 348/47 |
| 5,140,415 | A | * | 8/1992 | Choquet | 348/46 |
| 5,175,616 | A | * | 12/1992 | Milgram et al. | 348/47 |
| 5,682,198 | A | * | 10/1997 | Katayama et al. | 348/47 |
| 7,190,389 | B1 | * | 3/2007 | Abe et al. | 348/42 |
| 7,777,941 | B2 | * | 8/2010 | Zimmer | 359/378 |
| 2010/0247088 | A1 | * | 9/2010 | Campbell et al. | 396/325 |
| 2011/0018972 | A1 | * | 1/2011 | Pan | 348/47 |
| 2011/0109727 | A1 | * | 5/2011 | Matsuura | 348/47 |

FOREIGN PATENT DOCUMENTS

JP 2010-103895 5/2010

* cited by examiner

*Primary Examiner* — Rodney Fuller
(74) *Attorney, Agent, or Firm* — Panasonic Patent Center; Dhiren Odedra; Kerry Culpepper (57) ABSTRACT

A three-dimensional image pickup apparatus for capturing a three-dimensional image which includes a left-eye image and a right-eye image includes: a first imaging unit having a first optical system and operable to take the left-eye image; a second imaging unit having a second optical system and operable to take the right-eye image; and a controller operable to control the first imaging unit and the second imaging unit. The first optical system and the second optical system individually include a convergence angle changing unit capable of optically changing a convergence angle and a focal length changing unit capable of optically changing a focal length. The controller, when controlling the focal length changing unit to change the focal length, controls the convergence angle changing unit based on a predetermined constant convergence angle tracking curve to keep the convergence angle constant before and after the change of the focal length.

5 Claims, 9 Drawing Sheets

THREE-DIMENSIONAL IMAGE PICKUP APPARATUS AND THREE-DIMENSIONAL IMAGE PICKUP METHOD

BACKGROUND

1. Technical Field

The technical field relates to a three-dimensional image pickup apparatus for generating a three-dimensional image (stereoscopic image) by capturing an image for the left eye and an image for the right eye, and more particularly to a three-dimensional image pickup apparatus having a configuration capable of optically altering a focal length and a convergence angle.

2. Related Art

Today, a three-dimensional image pickup apparatus that generates a three-dimensional image (stereoscopic image) by capturing two images (a left-eye image and a right-eye image) comes into the spotlight. In the three-dimensional image, an image of a subject on the left-eye image and an image of the same subject on the right-eye image both have disparity corresponding to the binocular disparity of the right and left eyes of a human. When displaying the three-dimensional image, the left-eye image is presented to the left eye of a viewer and the right-eye image is presented to the right eye of the viewer, synchronously. The viewer of the three-dimensional image can use the disparity as a cue to perceive the depth of a subject, that is, stereoscopic effects.

The angle formed by an optical axis of a left-eye image camera for capturing the left-eye image and an optical axis of a right-eye image camera for capturing the right-eye image is referred to as a convergence angle. A plane which includes the intersecting point of the two optical axes forming the convergence angle and is parallel to the installation interval of the two cameras is referred to as a reference plane. In the three-dimensional image, a subject existing on the reference plane has a parallax of zero, and a subject not existing on the reference plane has a parallax of a magnitude and a direction depending on the distance and fore-and-aft relationship between the subject and the reference plane. The viewer who watches the three-dimensional image displayed on a screen plane of a three-dimensional display device perceives an object recorded in the three-dimensional image with zero parallax as if existing on the screen plane, and perceives an object recorded in the three-dimensional image with non-zero parallax as if existing farther or closer than the screen plane. In other words, a subject located farther than the reference plane at the shooting is perceived by the viewer with depth effects, and a subject located closer than the reference plane at the shooting is perceived by the viewer with projecting effects.

Accordingly, when capturing a three-dimensional image, it is extremely important to appropriately control a position of the reference plane. The position of the reference plane is determined in accordance with the convergence angle of the three-dimensional image pickup apparatus. Therefore, in an imaging of a three-dimensional image, appropriate control of the convergence angle is extremely important.

In the meantime, if a subject image having an extremely large parallax is included in a three-dimensional image, a certain discomfort may arise in the viewer. To avoid such situations, it is necessary to adjust the parallax of the subject by controlling the convergence angle of the three-dimensional image pickup apparatus to vary the position of the reference plane so as to create a three-dimensional image that may not provide the viewer with discomfort feeling.

JP 2010-103895A discloses a twin-lens image pickup apparatus for creating a three-dimensional image. This twin-lens image pickup apparatus is designed to capture a plurality of three-dimensional images automatically and continuously while controlling a built-in optical image stabilizer (lens-shift type) to vary the optical axes of the optical systems for altering the convergence angle variously. Accordingly, a user can select a three-dimensional image(s) which has stereoscopic effects suited for his/her taste from the three-dimensional images generated through the continuous shots.

SUMMARY

As mentioned above, it is known that means for varying the convergence angle of the three-dimensional image pickup apparatus can be realized with the use of the optical image stabilization mechanism.

However, for example, when the focal length of the optical system of the three-dimensional image pickup apparatus which employs the optical image stabilization mechanism as the means for varying the convergence angle is optically altered through a zoom operation or the like, the change in the focal length is accompanied by a change in the degree of optical axis deflection effect by the means for varying the convergence angle. As a result, the convergence angle of the three-dimensional image pickup apparatus changes before and after the zoom operation or the like. If the convergence angle is changed, the position of the reference plane is also changed, and, hence, the stereoscopic effects of the three-dimensional image also changes. Accordingly, in a conventional three-dimensional image pickup apparatus employing an optical image stabilization mechanism as means for varying the convergence angle, there is a problem that stereoscopic effects in three-dimensional images vary before and after the optical changing opera-ion of the focal length.

In view of the foregoing, according to the embodiment, there is provided a three-dimensional image pickup apparatus in which the change in the effects of the three-dimensional images before and after the optical changing operation of the focal length is suppressed to low level.

One aspect provides a three-dimensional image pickup apparatus for capturing a three-dimensional image which includes a left-eye image and a right-eye image. The three-dimensional image pickup apparatus includes: a first imaging unit having a first optical system and operable to take the left-eye image; a second imaging unit having a second optical system and operable to take the right-eye image; and a controller operable to control the first imaging unit and the second imaging unit. The first optical system and the second optical system individually include a convergence angle changing unit capable of optically changing a convergence angle and a focal length changing unit capable of optically changing a focal length. The controller, when controlling the focal length changing unit to change the focal length, controls the convergence angle changing on a predetermined constant convergence angle tracking curve to keep the convergence angle constant before and after the change of the focal length.

In the one aspect, it is possible that: the focal length changing unit is a variable magnification lens; the convergence angle changing unit is an optical path compensation lens; and the controller controls the convergence angle changing unit by deriving a position of the optical path compensation lens based on: the predetermined constant convergence angle tracking curve; a position of the optical path compensation lens before the change of the focal length; a position of the variable magnification lens before the change of the focal length; and a position of the variable magnification lens after the change of the focal length.

In the one aspect, it is possible that: the three-dimensional image pickup apparatus further includes a storage unit operable to store information about individual difference of the first optical system and the second optical system; and the control of the convergence angle changing unit by the controller is compensated based on the information about the individual difference.

In the one aspect, it is possible that: the three-dimensional image pickup apparatus further includes a storage unit operable to store information for specifying a focal length set when a power is cut off last and information for specifying a convergence angle set when the power is cut off last; and the controller, when the power is turned on, controls the first optical system and the second optical system so that the first optical system and the second optical system have the focal length set when the power is cut off last and the convergence angle set when the power is cut off last.

Another aspect provides a three-dimensional image pickup method in a three-dimensional image pickup apparatus including a first imaging unit having a first optical system and operable to take a left-eye image, a second imaging unit having a second optical system operable to take a right-eye image, and a controller operable to control the first imaging unit and the second imaging unit, the first optical system and the second optical system individually having a convergence angle changing unit capable of optically changing a convergence angle and a focal length changing unit capable of optically changing a focal length. The three-dimensional image pickup method includes: controlling the focal length changing unit to change the focal length; and controlling, when changing the focal length, the convergence angle changing unit based on a predetermined constant convergence angle tracking curve to keep the convergence angle constant before and after the change of the focal length.

DETAILED DESCRIPTION OF PREFERRED EMBODIMENTS

The three-dimensional image pickup apparatus according the embodiment is capable of suppressing the changes in the stereoscopic effects of the three-dimensional images before and after the optical changing operation of the focal length.

The three-dimensional image pickup apparatus according to the embodiment is specifically described below with reference to the accompanying drawings.

1. Outline

The embodiment is a three-dimensional image pickup apparatus including a focal length varying mechanism and a convergence angle varying mechanism. The focal length varying mechanism may be, for example, a variable magnification lens (focal length changing unit) included in the optical system and an actuator capable of driving the same. The convergence angle varying mechanism may be, for example, an optical path compensation lens (convergence angle changing unit) included in the optical system and an actuator for driving the same. The convergence angle varying mechanism may include the same elements as those of an optical image stabilization mechanism. The three-dimensional image pickup apparatus according to the embodiment is capable of retaining a constant convergence angle of the three-dimensional image pickup apparatus before and after the change of the focal length, by controlling and driving the optical path compensation lens in accordance with a constant convergence angle tracking curve described below while driving the variable magnification lens to change the focal length of the optical system.

Accordingly, in the three-dimensional image pickup apparatus according to the embodiment, the change of the convergence angle is suppressed to a minimum before and after a zoom operation. Thus, a user easily takes the three-dimensional images of same stereoscopic effects before and after the zoom operation.

2. Configuration

Figure 1:
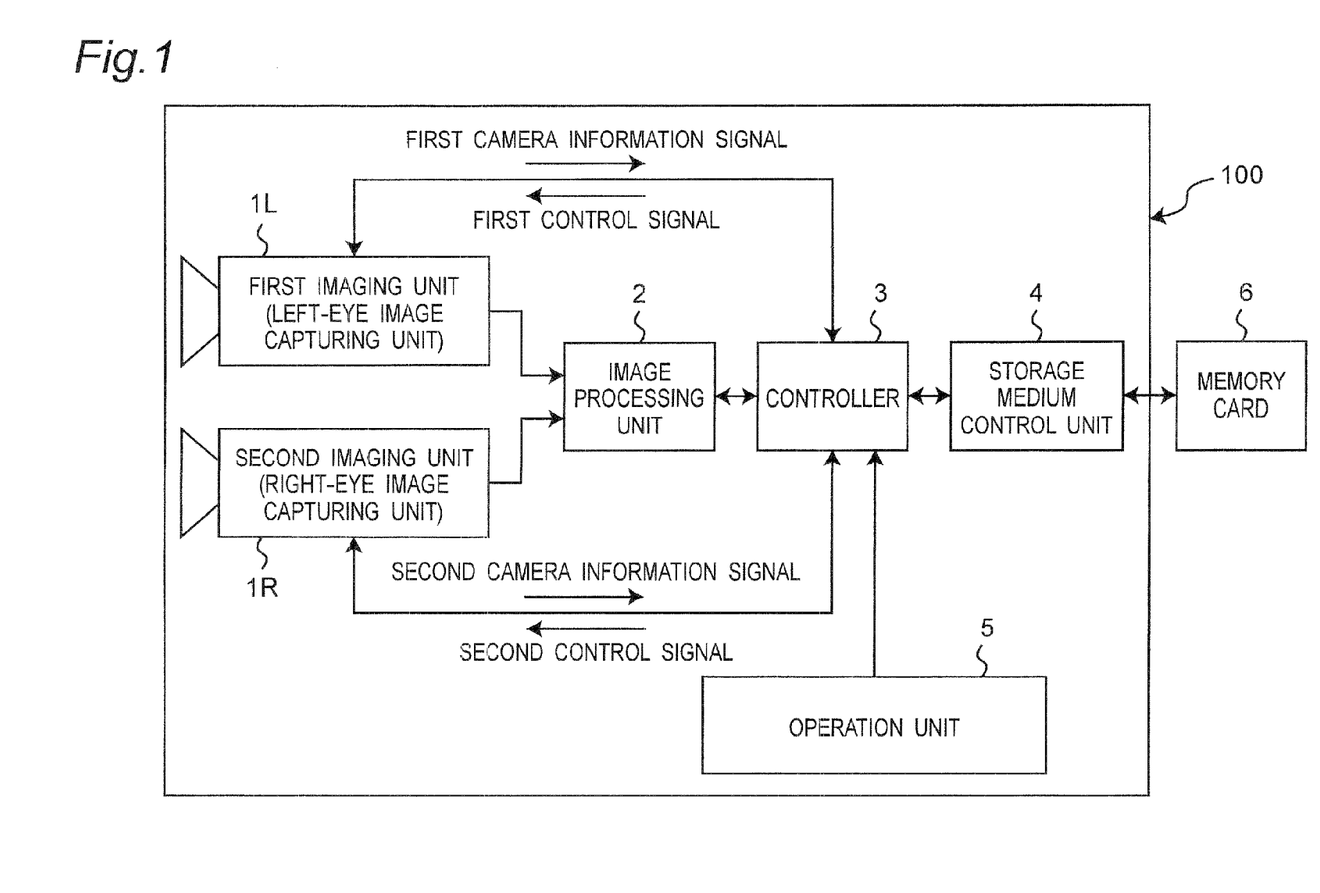
FIG. 1 is a block diagram of a configuration of a three-dimensional image pickup apparatus according to an embodiment.

FIG. 1 is a block diagram of a configuration of a three-dimensional image pickup apparatus 100 according to the embodiment. The three-dimensional image pickup apparatus 100 includes: a first imaging unit 1L capable of capturing a left-eye image; a second imaging unit 1R capable of capturing a right-eye image; an image processing unit 2; a controller 3; a storage medium control unit 4; and an operation unit 5. The storage medium control unit 4 is capable of connecting with a memory card 6.

2.1. Imaging Units

The first imaging unit 1L and the second imaging unit 1R are disposed at a specific distance. Generally, the specific distance is set to about 65 mm which corresponds to a mean interpupillary distance of adults. However, in the three-dimensional image pickup apparatus 100, the distance is not limited to such distance.

The left-eye image captured by the first imaging unit 1L and the right-eye image captured by the second imaging unit 1R are respectively sent to the image processing unit 2. The image processing unit 2 is capable of performing a number of different types of processes to the left-eye image and the right-eye image. After the image processing, data of the left-eye image and data of the right-eye image are recorded onto the memory card 6 by way of the storage medium control unit 4. The three-dimensional image pickup apparatus 100 may take at least any one of a still picture image and a moving picture image.

Figure 2:
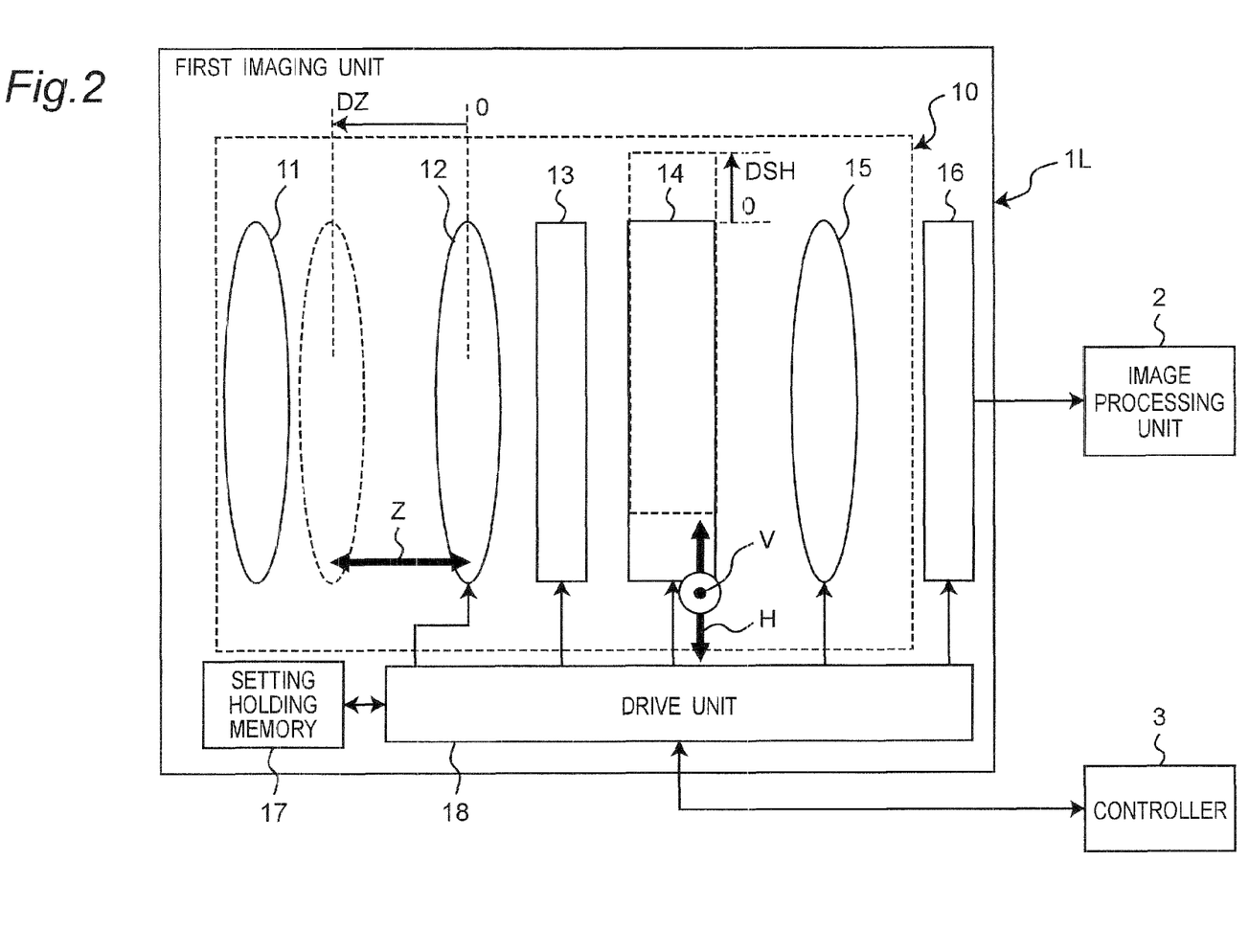
FIG. 2 is a block diagram of a detailed configuration of a first imaging unit.

Referring now to FIG. 2, the configuration of the first imaging unit 1L is described in detail. The first imaging unit 1L includes: a lens group capable of forming an image of a subject (optical system 10); an image sensing element 16 on which an image of the subject is formed by the optical system 10; a setting holding memory 17 capable of holding the intrinsic information of the optical system 10 (individual difference information recoded before shipping from the factory, etc.) and various types of setting information items etc.; and a drive unit 18 capable of controlling and driving actuators (not shown) respectively connected to lenses of the optical system 10 (11, 12, 14, 15) and an iris 13, and the image sensing element 16.

2.1.1. Optical System

The optical system 10 includes: an objective lens 11; a variable magnification lens 12 (focal length changing unit); the iris 13; an optical path compensation ions 14 (convergence angle changing unit); and a focusing lens 15.

The objective lens 11 is a lens disposed at the end of the subject side of the optical system 10.

The variable magnification lens (zoom-lens) 12 moves along the direction of arrow Z, thereby the subject image formed on the image sensing element 16 is enlarged or reduced. The variable magnification lens-lens 12 may be configured as a lens group having a plurality of lenses (zoom system).

The drive unit 18 can control the actuator of the variable magnification lens 12 to move the zoom-lens 12 in the direction of arrow Z. Herein, the position of the zoom-lens 12 is expressed as a displacement DZ from a specific position (Z-direction origin O in the figure, which may be (arbitrarily) determined as an offset position). The focal length of the optical system 10 varies while the position DZ of the zoom-lens 12 changes. The drive unit 18 can change the position DZ of the zoom-lens 12 to change the focal length of the optical system 10 in accordance with a focal length changing instruction which may be included in a first control signal sent from the controller 3.

The iris 13 adjusts the size of an aperture included in the iris 13 either automatically or according to the setting entered by the user through the operation unit 5 to adjust the quantity of light passing through the iris 13. The iris 13 may include an ND filter and the like.

The optical path compensation lens 14 is a lens capable of moving in the horizontal direction H (the direction of an arrow H) and in the vertical direction V (the direction V vertical to the figure). Herein, the horizontal direction H and the vertical direction V may be included in a plane vertical to the optical axes of the objective lens 11, the zoom-lens 12, and the focusing lens 15 etc. The horizontal direction H may be a direction coinciding with the horizontal direction of a three-dimensional image. The horizontal direction H may be also a direction of the installation interval of the first imaging unit 1L and the second imaging unit 1R. The vertical direction V is a direction orthogonal to the horizontal direction H.

The optical path compensation lens 14, when located at a position other than a specific position (neutral position), acts to deflect the optical path of light entering from the objective lens 11 side and pass the light through to the focusing lens 15 side. In other words, the optical path compensation lens 14 is an optical system capable of providing an effect of deflecting the optical axis of the optical system 10. Herein, the position of the optical path compensation lens 14 along the horizontal direction H is expressed as a displacement DSH from the position of the optical path compensation lens 14 at which the deflection amount of the optical path of the optical system 10 by the optical path compensation lens 14 is zero (H-direction origin O, neutral position, in the figure). By changing the position DSH of the optical path compensation lens 14, the horizontal direction component of the direction of the optical axis of the optical system 10 can be deflected. The position of the optical path compensation lens 14 along the vertical direction V is expressed as a displacement DSV from the position of the optical path compensation lens 14 at which the deflection amount of the optical path of the optical system 10 by the optical path compensation lens 14 is zero. By changing the position DSV of the optical path compensation lens 14, the vertical direction component of the direction of the optical axis of the optical system 10 can be deflected. It is to be noted that the optical path compensation lens 14 should not be particularly specified as far as it includes an optical element providing a similar effect as that of the compensation lens of the lens-shift type optical image stabilization mechanism. Further, the optical path compensation lens 14 may include a plurality of lenses.

The drive unit 18 can control the actuator of the optical path compensation lens 14 to move the optical path compensation lens 14 in the horizontal direction H and in the vertical direction V. The drive unit 18 can change the horizontal position DSH (and/or the vertical position DSV) of the optical path compensation lens 14 in accordance with a convergence angle changing instruction which may be included in the first control signal sent from the controller 3.

The focusing lens 15 can move axially along the optical axes of the objective lens 11, the variable magnification lens 12, the focusing lens 15, and others. The focusing lens 15 is an optical element providing an effect of adjusting the focus of the subject image formed on the image sensing element 16. The focusing lens 15 may include a plurality of lenses.

2.1.2. Other Component Elements

The image sensing element 16 picks up a subject image formed by the optical system 10, and generates image data. The image sensing element 16 may be a solid-state image sensing device such as a CCD image sensor or a CMOS image sensor. The image sensing element 16 may be a single-plate type or a three-plate type which includes image sensing elements separately for R, G, and B signals.

The drive unit 18 can control and drive the iris 13, the focusing lens 15, and the image sensing element 16 as well as the variable magnification lens 12 and the optical path compensation lens 14.

The setting holding memory 17 can hold the data for the drive unit 18 to be held while the power is off. A flash memory, a ferroelectric memory, or the like may be used as the setting holding memory 17. The data held by the setting holding memory 17 include, for example, information about the focal length being set when the power is cut off last, information about the convergence angle set when the power is cut off last, information about the individual differences inherent in the imaging unit (deviations from the design specification) measured and recorded in the factory, and others.

The second imaging unit 1R may have a configuration substantially same as that of the first imaging unit 1L.

2.2. Image Processing Unit

The image processing unit 2 is capable of performing image processing such as AD conversion, pre-processing, and image compression. In the pre-processing, a number of types of camera signal processing to AD converted image data such as gamma correction, white balance correction, flaw correction may be performed. In the image compression, the image data is compressed by means of DCT (discrete cosine transform), Huffman coding, and the like. The image compression compresses the image data to a compressed format conforming to the standard of MPEG-2, H.264, or the like, for example. The format is not limited to the format such as MPEG-2 and H.264. The image processing unit 2 may be realized with the use of a DSP, a microprocessor, or the like.

In the present embodiment, both of left- and right-channel images captured by the first and second imaging unit 1L and 1R are processed in a single image processing unit. It is, however, possible that two separate image processing units 2 may be installed to respectively process a left-eye image captured by the first imaging unit 1L and a right-eye image captured by the second imaging unit 1R.

2.3. Controller

The controller 3 is control means for controlling the entire three-dimensional image pickup apparatus 100. The controller 3 may be realized using a semiconductor device such as a microcomputer. The controller 3 may be composed only with hardware, or may be realized by a combination of hardware and software. In the latter case, the software (computer program) may be installed before shipping from the factory. The software may be installed after shipping from the factory. The software may be stored and distributed in a storage medium such as a memory card. The software may also be delivered via the Internet or other communication lines.

The controller 3 receives the information about setting or the like of the first imaging unit 1L from the first imaging unit 1L as a first camera information signal. For example, the first camera information signal may include: the information of the focal length currently set; the information about the convergence angle currently set; the information about the focal length set when the power is cut off last; the information about the convergence angle set when the power is cut off last; the information about the individual difference of the imaging unit measured and recorded in the factory, etc. The information about the focal length may include information about the position DZ of the variable magnification lens 12. The information about the convergence angle may include information about the position (DSH, DSV) of the optical path compensation lens 14. The information about the individual difference of the imaging unit may be information about the deviation from the design specification of the imaging unit.

The controller 3 sends to the first imaging unit 1L a signal for controlling and driving the first imaging unit 1L as a first control signal. The first control signal may include: a focal length changing instruction; a convergence angle changing instruction; an execution instruction for correcting the deviation due to the individual difference of the imaging device, etc. The focal length changing instruction may include a focal length changing target value. The focal length changing target value may be a position target value of the variable magnification lens 12. The convergence angle changing instruction may include a convergence angle changing target value. The convergence angle changing target value may be a position target value of the optical path compensation lens 14.

Similarly, the controller 3 sends a second control signal to the second imaging unit 1R and receives a second camera information signal from the second imaging unit 1R.

2.4. Storage Medium Control Unit and Memory Card

The storage medium control unit 4 is detachably connected with a memory card 6. The storage medium control unit 4 can mechanically and electrically be connected with the memory card 6. The memory card 6 includes inside a flash memory, a ferroelectric memory or the like, and can store data therein.

In the embodiment, the memory card 6 is explained as it has a detachable structure, but the memory card 6 may be incorporated in the three-dimensional image pickup apparatus 100. In the embodiment, the memory card 6 is used as a recording medium. However, the recording medium is not limited to the memory card, but may include an optical disc, a hard disk, a magnetic tape, or others.

As explained in the embodiment, both the left-eye image captured by the first imaging unit 1L and the right-eye image captured by the second imaging unit 1R are recorded in the same memory card 6. However, the storage medium control unit 4 may be capable of connecting with a plurality of memory cards 6, and the left-eye image captured by the first imaging unit 1L and the right-eye image captured by the second imaging unit 1R may be recorded in different memory cards.

2.5. Operation Unit

The operation unit 5 is a component element(s) collectively referring to a number of types of operating means. The operation unit 5 is a so-called user interface of the three-dimensional image pickup apparatus 100. The operation unit 5 includes a power button for turning on and off the power of the three-dimensional image pickup apparatus 100, a zooming lever for zooming operation, and others. The operation unit 5 receives an instruction from a user, and transmits the instruction to the controller 3. The user may manipulate the operation unit 5 to instruct the three-dimensional image pickup apparatus 100 to perform the focal length changing operation (so-called zooming operation) etc.

3. Operation

The control for retaining a constant convergence angle in the three-dimensional image pickup apparatus 100 of the embodiment is explained below.

3.1. Convergence Angle Varying Operation

Figure 3:
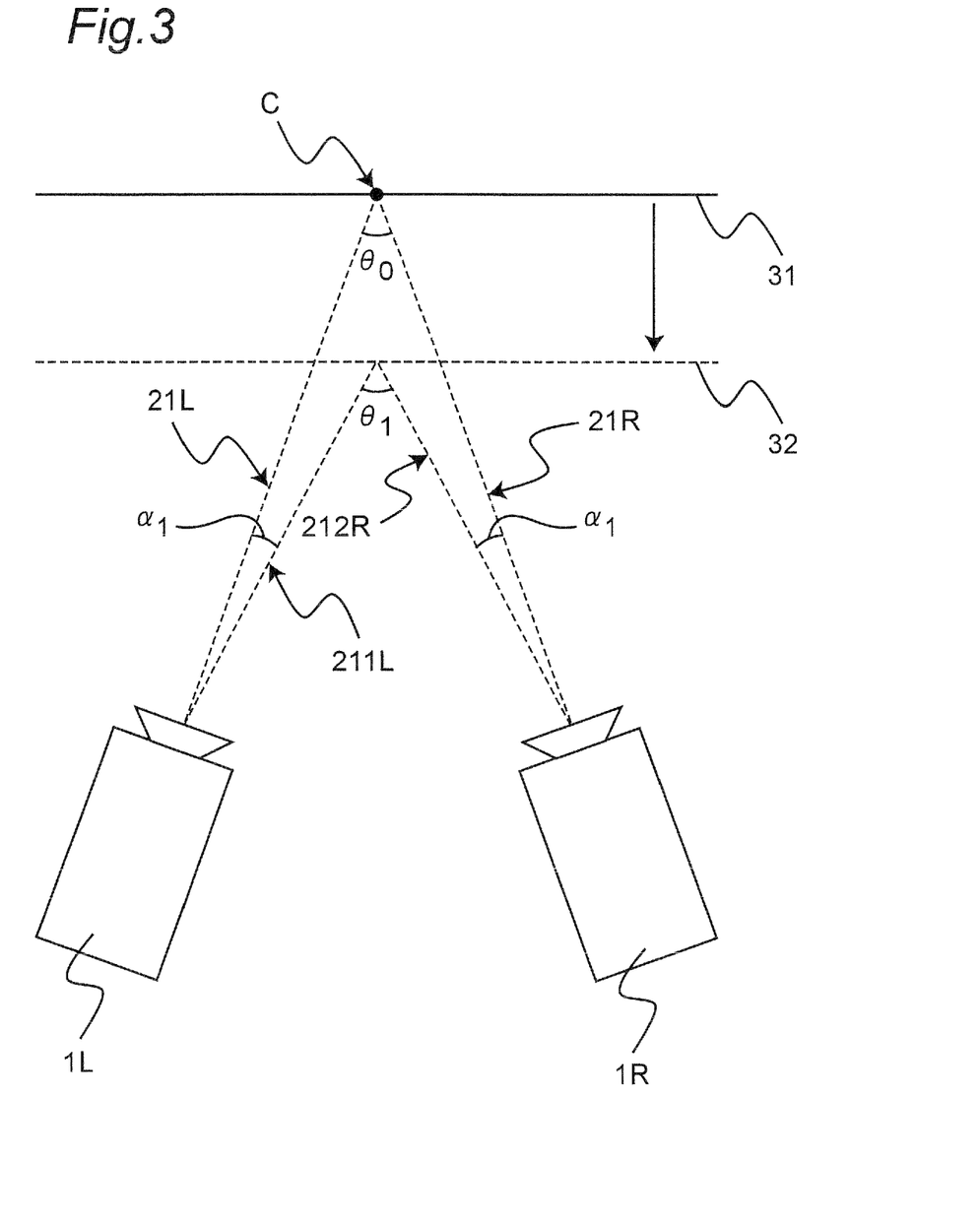
FIG. 3 is a schematic diagram illustrating a convergence angle and a reference plane of the three-dimensional image pickup apparatus.

FIG. 3 is a schematic diagram showing the configuration of the first imaging unit 1L and the second imaging unit 1R, and the relation between the convergence angle and the reference plane. In FIG. 3, the three-dimensional image pickup apparatus 100 is seen from the top. In the figure, an optical axis 21L is the optical axis of the first imaging unit 1L when the horizontal position (DSH) of the optical path compensation lens 14 of the optical system 10 is located at the neutral position (DSH=0), and similarly an optical axis 21R is the optical axis of the second imaging unit 1R. Herein, the neutral position is the position of the optical path compensation lens 14 in which the degree of optical path deflection effect (optical path angle $\alpha$) is zero as mentioned above.

When the optical path compensation lens 14 is at the neutral position, the optical axis 21L and the optical axis 21R intersect at a convergence point C. In the present situation, the optical axis 21L and the optical axis 21R form an angle of $\theta_0$. The plane 31 including the convergence point C is referred to as the reference plane. The convergence angle $\theta$ is $\theta_0$.

When the optical path compensation lens 14 is not positioned at the neutral position (DSH=DSH$_1 \neq$0), the optical path compensation lens 14 deflects the direction of the optical axis 21L (and the optical axis 21R). The optical axis 211L is the optical axis of the first imaging unit 1L which has undergone the optical axis deflection action by the optical path compensation lens 14. Similarly, the optical axis 211R is the optical axis of the second imaging unit 1R which has undergone the optical axis deflection action by the optical path compensation lens 14. In the figure, the optical axis 21L is deflected by an optical path angle $\alpha_1$ to the direction of the second imaging unit 1R, and the optical axis 21R is deflected by the optical path angle $\alpha_1$ to the direction of the first imaging unit 1L.

In this situation, the convergence angle $\theta$ of the three-dimensional image pickup apparatus 100 becomes $\theta_1$ ($\theta_1 > \theta_0$), and the reference plane is changed to a plane 32 from a plane 31. In this manner, the three-dimensional image pickup apparatus 100 is capable of changing the convergence angle and the reference plane by controlling the position of the optical path compensation lens 14 to deflect the optical axis of the optical system 10. The optical path compensation lens 14 of the first imaging unit 1L and the optical path compensation lens of the second imaging unit 1R may be controlled to be driven in mutually opposite directions along the horizontal direction.

3.2. Relation Between the Convergence Angle Changing Effect and the Focal Length Changing Unit's Focal Length Changing Action Referring now to FIGS. 4A, 4B, and 4C, the relation between an amount of the optical axis deflection (optical path angle α) by the optical path compensation lens 14 and the focal length is explained.

Figure 4A:
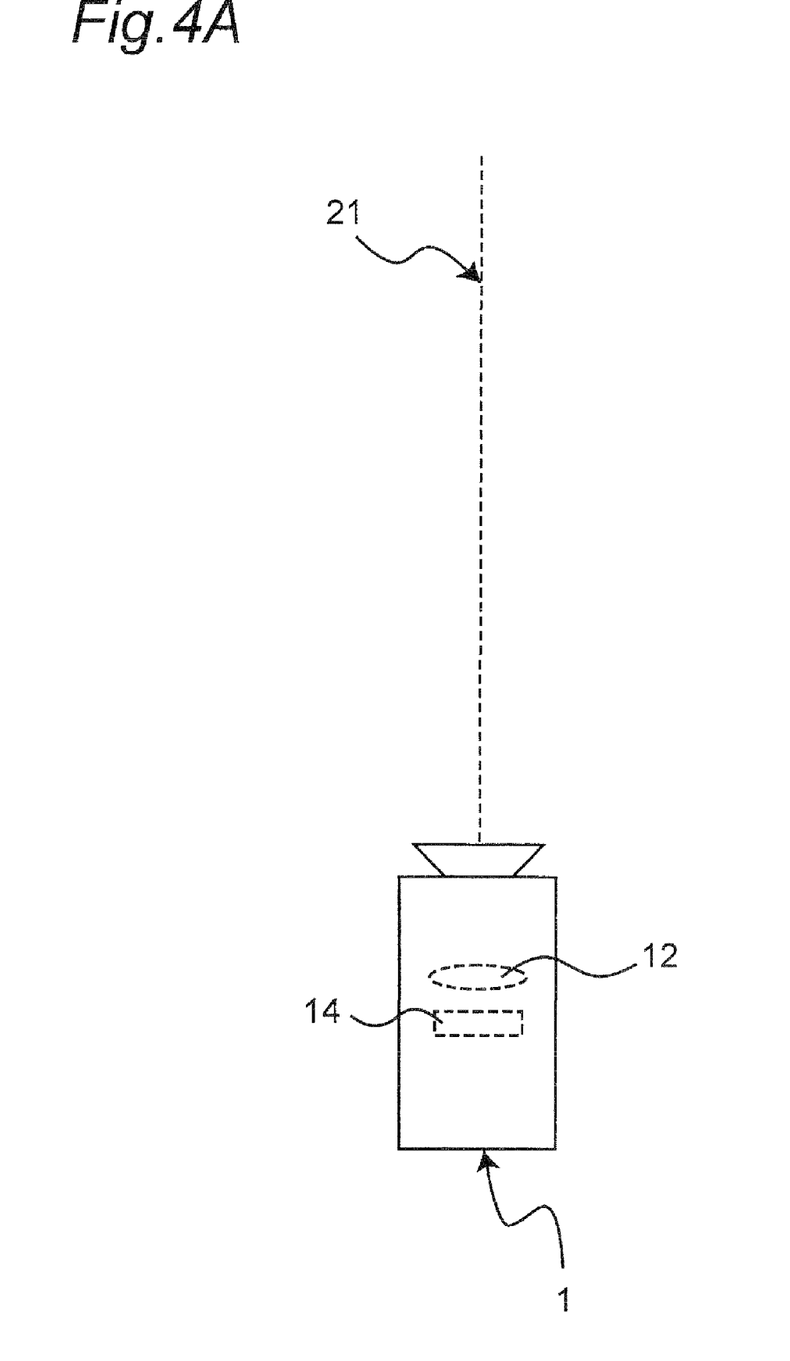
FIG. 4A is a diagram of an optical axis when no optical axis deflection effect by a convergence angle changing unit is in effect.

FIG. 4A shows the imaging unit 1 in case where the variable magnification lens 12 is positioned at a specific position (for example, the offset position DZ=0) and the optical path compensation lens 14 is positioned at a specific position (for example, the neutral position, DSH=0). At this situation, the optical axis of the imaging unit 1 extends along the direction of the optical axis 21. That is, in this situation, the amount of the optical axis deflection (optical path angle α) by the optical path compensation lens 14 is zero.

Figure 4B:
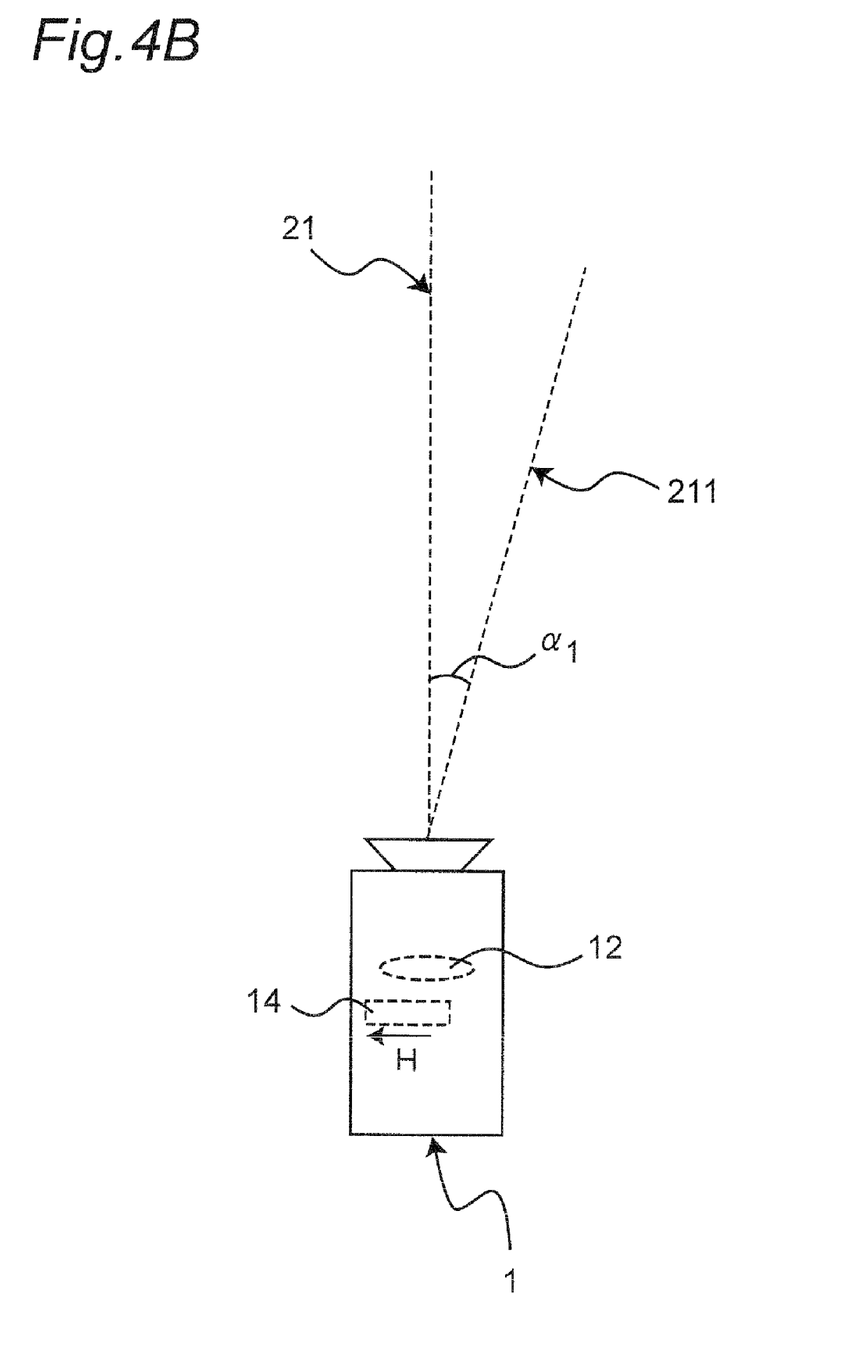
FIG. 4B is a diagram of the optical axis when the optical axis deflection effect by the convergence angle changing unit is in effect.

FIG. 4B shows the imaging unit 1 in case where the optical path compensation lens 14 is displaced from the neutral position along the horizontal direction H by a specific amount (DSH=DSH$_1$≠0), and the variable magnification lens 12 is positioned at the offset position (DZ=0). At this situation, the optical axis of the imaging unit 1 varies to the optical axis 211 which is deflected by the optical path angle α$_1$ (optical axis deflection amount) clockwise from the axis 21 due to the action of the optical path compensation lens 14.

Figure 4C:
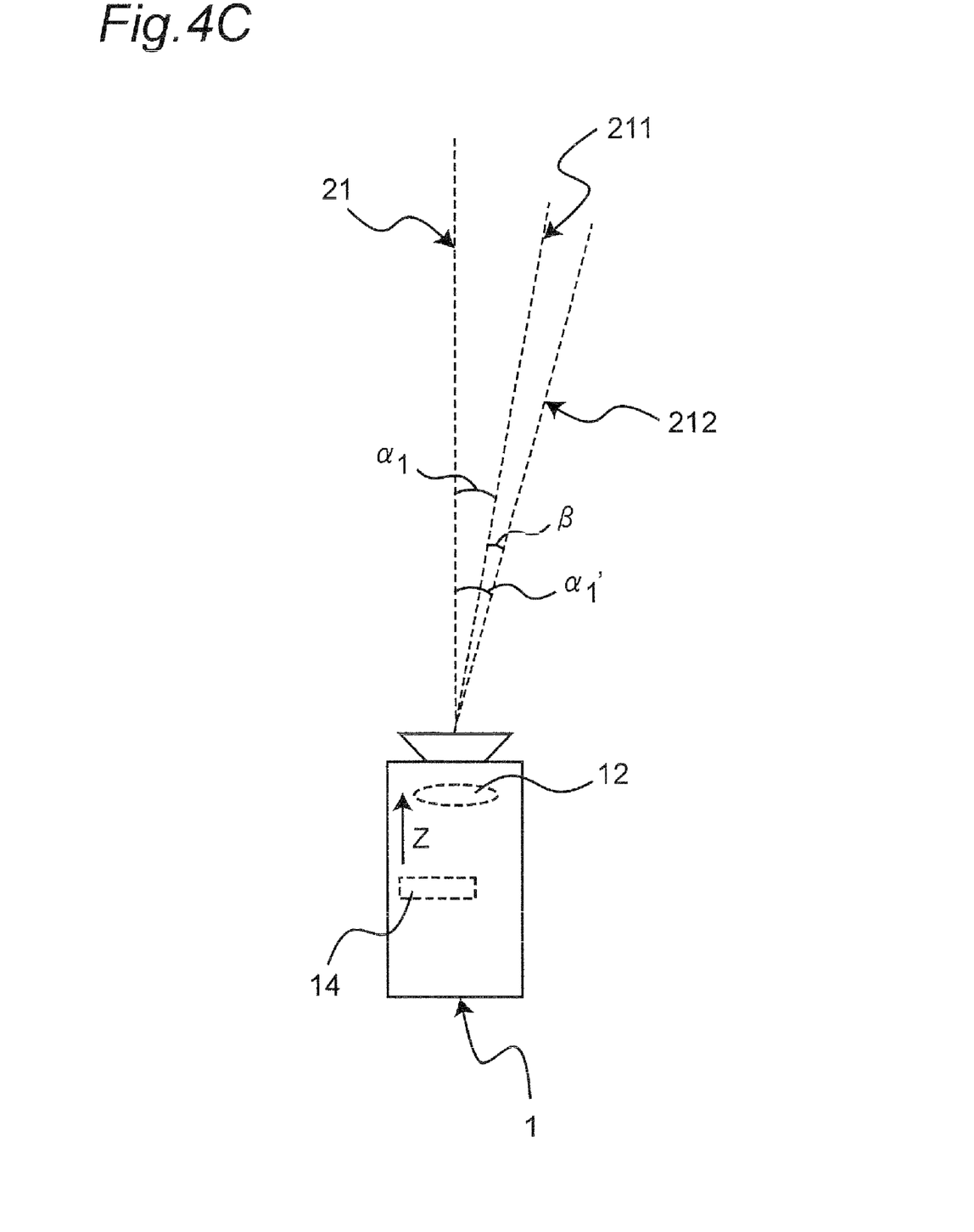
FIG. 4C is a diagram of the an optical axes before and after the focal length is optically changed while the optical axis deflection effect by the convergence angle changing unit is in effect.

FIG. 4C shows the imaging unit 1 after only the position of the variable magnification lens 12 is changed from the situation depicted FIG. 4B to change the focal length of the optical system 10. In FIG. 4C, the optical path compensation lens 14 is positioned at DSH=DSH$_1$≠0 same as the position in FIG. 4B, and the position of the zoom-lens 12 is changed by a specific amount from the offset position (DZ=0) along the Z direction. As the focal length varies due to the action of the variable magnification lens 12, the optical axis of the imaging unit 1 varies by an angle β clockwise from the optical axis 211, and coincides with the optical axis 212. In short, the optical axis deflection amount (optical path angle α) by the optical path compensation lens 14 at this situation becomes α$_1$'.

In other words, the degree of the optical axis deflection by the optical path compensation lens 14 varies depending on the focal length of the optical system 10. Therefore, if the focal length is changed by the variable magnification lens 12 while retaining the position of the optical path compensation lens 14 (the displacement amount from the neutral position), the degree of the optical axis deflection (optical path angle α) by the optical path compensation lens 14 varies before and after the focal length changing action. In such a case, the convergence angle θ and the position of the reference plane vary before and after the focal length changing action.

Accordingly, in order to retain the convergence angle θ and the position of the reference plane before and after the focal length changing action by the zoom-lens 12, it is required to change the position DSH of the optical path compensation lens 14 in accordance with the focal length variation.

3.3. Constant Convergence Angle Tracking Curves

The optical axis deflection amount (optical path angle α) by the optical path compensation lens 14 for an arbitrary focal length (that is, an arbitrary position of the variable magnification lens 12) can be derived from optical characteristics of the lens(es) of the optical system 10 and arrangement of the lens(es) on the basis of geometrical optics.

Figure 5:
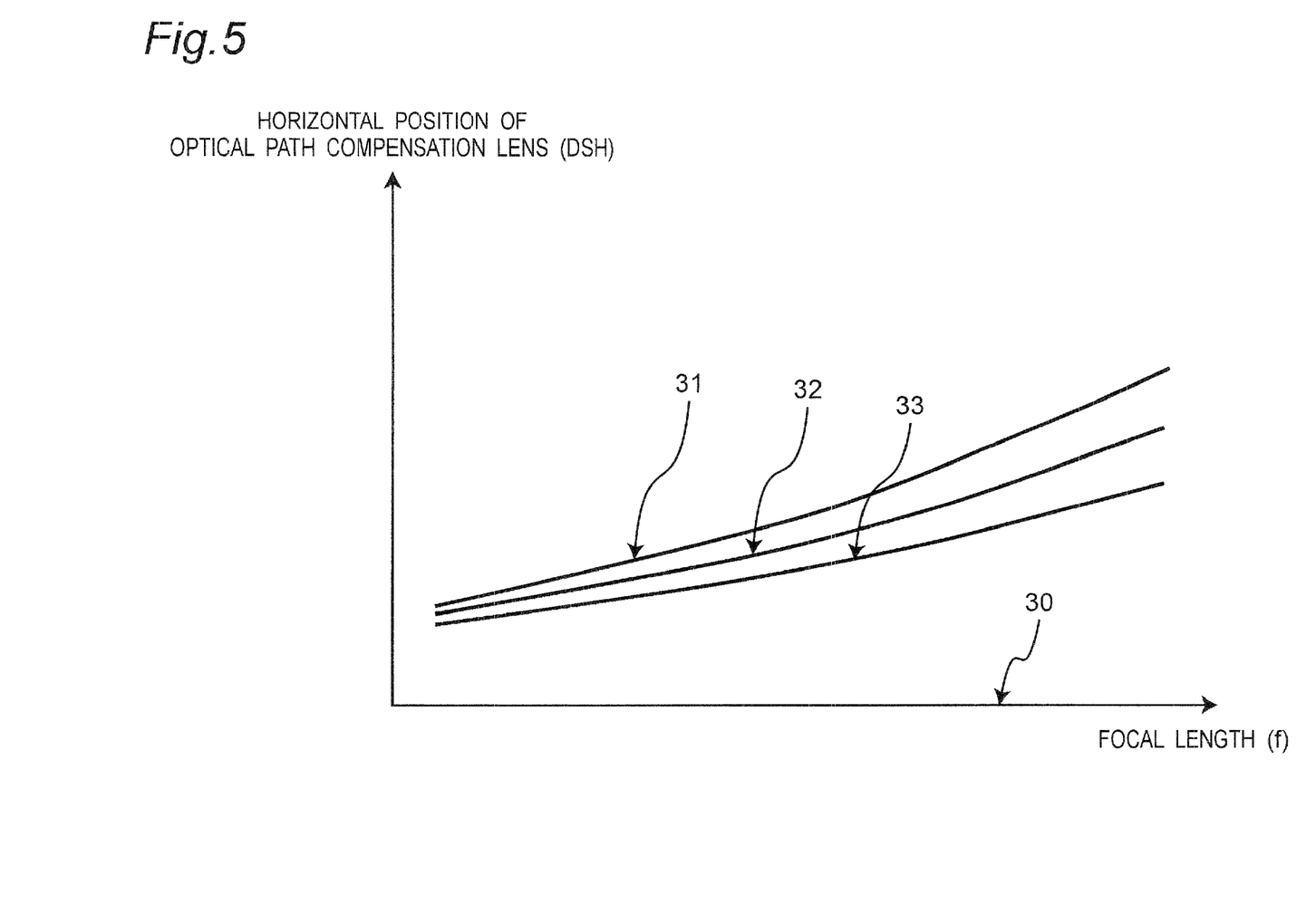
FIG. 5 is an example of a constant convergence angle tracking curve.

FIG. 5 shows tracking curves 30, 31, 32, and 33 representing the relation between the horizontal position (DSH) of the optical path compensation lens 14 and the focal length (f) of the optical system 10, in which the optical axis deflection amount by the optical path compensation lens 14 is kept constant. In short, by changing the horizontal position of the optical path compensation lens 14 along any of the tracking curves, the optical axis deflection amount (optical path angle α) of the optical path compensation lens 14 can be kept constant while the focal length of the optical system 10 varies. Thus, by changing the horizontal position DSH of the optical path compensation lens 14 along any of the tracking curves, the convergence angle θ of the three-dimensional image pickup apparatus 100 can be kept constant.

The tracking curve 30 (coinciding with the axis of the focal length f) is a constant convergence angle tracking curve for the case in which the optical path compensation lens 14 is positioned at the neutral position (DSH=0). If the optical axis deflection amount (optical path angle α) by the optical path compensation lens 14 is zero, the horizontal component of the orientation of the optical axis of the three-dimensional image pickup apparatus 100, that is, the convergence angle θ does not vary before and after the focal length changing action.

The constant convergence angle tracking curves 31, 32, and 33 are constant convergence angle tracking curves when the optical path compensation lens 14 is not positioned at the neutral position (DSH≠0). The constant convergence angle tracking curve 31 is a tracking curve on which the optical axis deflection amount (optical path angle α) by the optical path compensation lens 14 is maintained at angle A1. Similarly, the constant convergence angle tracking curves 32 and 33 are tracking curves on which the optical axis deflection amount (optical path angle α) by the optical path compensation lens 14 is maintained at angles A2 and A3. Herein, the optical axis deflection amounts (optical path angles) A1, A2, and A3 are in the relation of A1>A2>A3.

If the optical axis deflection amount (optical path angle α) by the optical path compensation lens 14 is kept constant before and after the focal length changing action, the convergence angle θ of the three-dimensional image pickup apparatus 100 is also kept constant before and after the focal length changing action. Accordingly, the three-dimensional image pickup apparatus 100 of the embodiment changes the position (DSH) of the optical path compensation lens 14 on the basis of the constant convergence angle tracking curves 30, 31, 32, and 33 as shown in FIG. 5 to keep the optical path angle α constant before and after the changing action of the focal length (f). Therefore, the change of the convergence angle θ before and after the focal length changing action is effectively suppressed.

Figure 6:
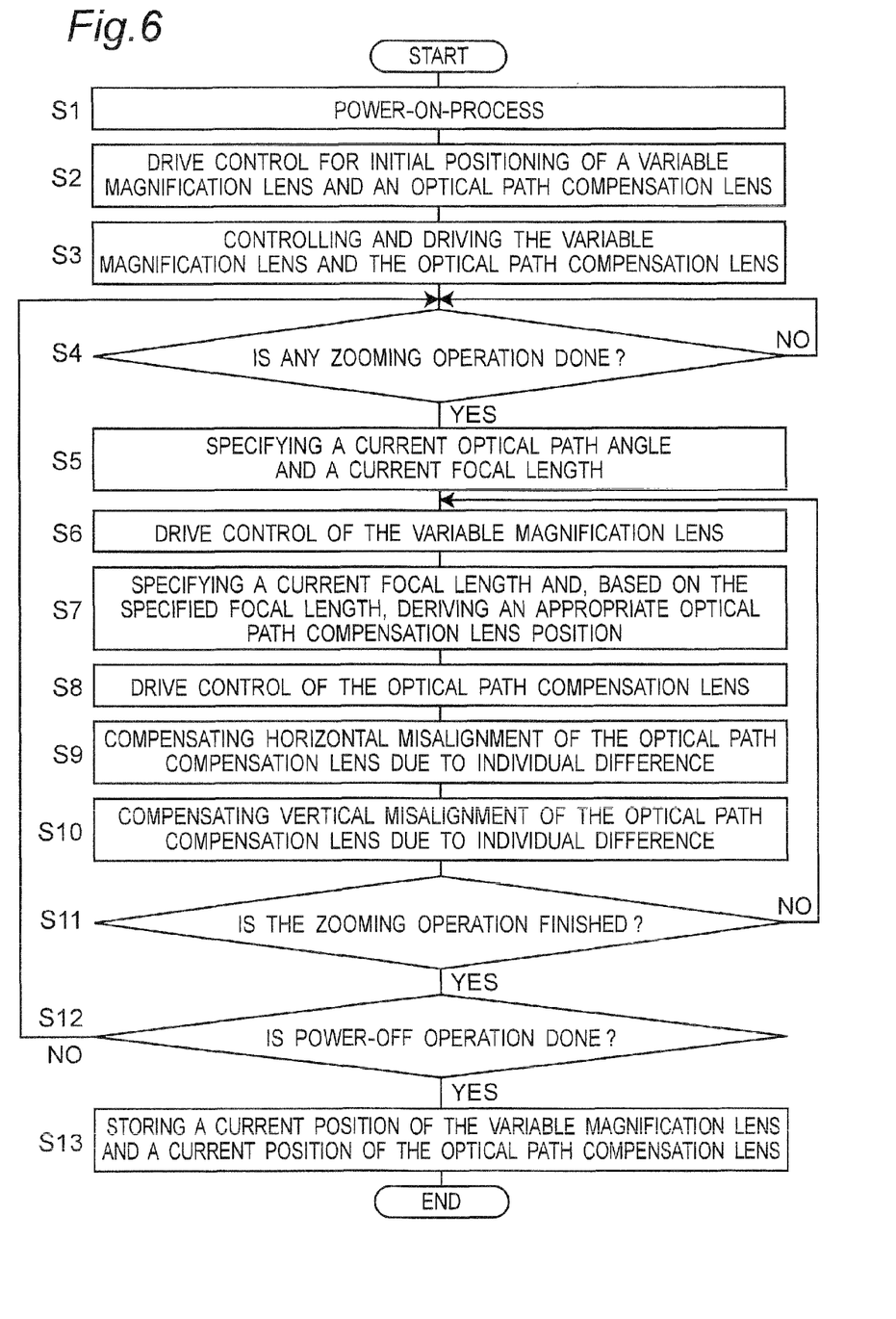
FIG. 6 is a flowchart performed by the three-dimensional image pickup apparatus according to the embodiment.

3.4. Control for Retaining a Constant Convergence Angle During Focal Length Changing Action FIG. 6 is a flowchart of processing for retaining a constant convergence angle before and after the focal length changing action. Referring to the flowchart in FIG. 6, the process performed by the three-dimensional image pickup apparatus 100 when the focal length varies is specifically explained below.

When the user manipulates the operation unit 5 to turn on the power of the three-dimensional image pickup apparatus 100, the three-dimensional image pickup apparatus 100 performs a predetermined power-ON-process (S1). At this process, the controller 3 sends to the first imaging unit 1L and the second imaging unit 1R an instruction for restoring the focal length and the convergence angle of the optical system 10 to the condition when the power is cut off last (S2).

Receiving this instruction, the drive units 18 of the first imaging unit 1L and the second imaging unit 1R retrieve the information for specifying the focal length when the power is cut off last (for example, the information of the position DZ of the variable magnification lens 12) and the information for specifying the convergence angle when the power is cut off last (for example, the information of the position DSH of the optical path compensation lens 14), respectively from the setting holding memories 17 of the first imaging unit 1L and the second imaging unit 1R. Then, the drive unit 18 controls and drives the variable magnification lens 12 and the optical path compensation lens 14 so as to restore the focal length and the convergence angle of the optical system 10 to the condition when the power is cut off last (S3).

When the user manipulates the operation unit 5 to enter an instruction to change the focal length (Yes at step S4), the controller 3 specifies the optical path angle α of the present (immediately before the focal length is changed) optical path compensation lens 14 and the present focal length f of the optical system 10 (S5). The process to specify the present optical path angle and the present focal length at this step can be performed based on the present optical path compensation lens 14 position DSH and the present variable magnification lens 12 position DZ.

The controller 3 may be provided with constant convergence angle (constant optical path angle) tracking curves 31, 32, and 33 as shown in FIG. 5 for a plurality of specific convergence angles. Alternatively, the controller 3 may be provided with one constant convergence angle (constant optical path angle) tracking curve 41 as shown in FIG. 7 for one specific convergence angle instead of the plurality of constant convergence angle tracking curves 31, 32, and 33 as shown in FIG. 5.

Figure 7:
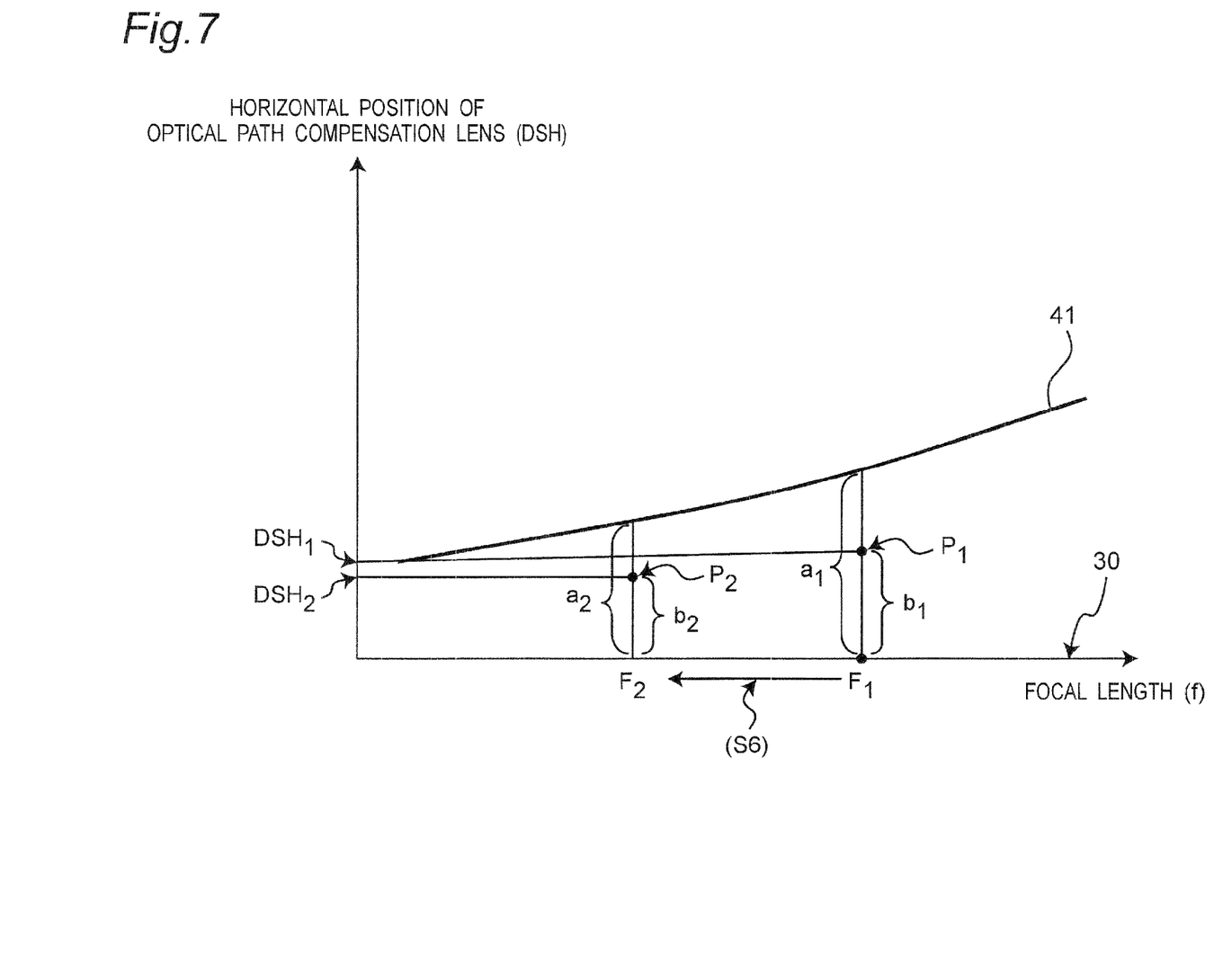
FIG. 7 is an example a constant convergence angle tracking curve.

In the following explanation, the controller 3 is supposed to be provided with the single constant convergence angle tracking curve 41 as shown in FIG. 7.

At the step S5 above described, the controller 3 retrieves the present (immediately before the focal length is changed) position $DSH_1$ of the optical path compensation lens 14 and the present position $DZ_1$ of the variable magnification lens 12 from the first imaging unit 1L and the second imaging unit 1R. Then, focal length $F_1$ of the optical system 10 is specified from the position $DZ_1$ of the variable magnification lens 12. Then, the controller 3 specifies a point P1 in FIG. 7 which corresponds to the combination of the present position $DSH_1$ of the optical path compensation lens 14 and the present focal length $F_1$ of the optical system 10. Further, the controller 3 can specify the present optical path angle α from the relation of the tracking curve 41 and the point P1. More specifically, the present optical path angle $\alpha_1$ may be derived with the following equation, $$\alpha_1 = \alpha_0 \times (b_1/a_1) \quad \text{(Equation 1)}$$

where the tracking curve 41 is a tracking curve in which the optical path angle α is constantly maintained as $\alpha_0$.

Next, the controller 3 changes the position DZ of the variable magnification lenses 12 in the first imaging unit 1L and the second imaging unit 1R to change the focal length f according to the instruction from the user (S6).

The controller 3 retrieves the present (after the focal length is changed) position $DZ_2$ of the variable magnification lenses 12 from the first imaging unit 1L and the second imaging unit 1R and specifies the present focal length $F_2$ of the optical system 10 from the position $DZ_2$ of the variable magnification lens 12. The controller 3 derives a position $DSH_2$ of the optical path compensation lens 14 (an appropriate optical path compensation lens position) in which the optical path angle is $\alpha_1$ under the present focal length $F_2$ based on the tracking curve 41 (S7).

More specifically, the controller 3 derives $DSH_2$ by finding $b_2$ that satisfies the relation of $(b_1/a_1)=(b_2/a_2)$ of FIG. 7. That is, DSH2 may be expressed as follows:

$$DSH_2 = b_2 = b_1 \cdot a_2/a_1 = DSH_1 \cdot (a_2/a_1) \quad \text{(Equation 2)}$$

where $a_1$ and $a_2$ are the position values of the optical path compensation lens on the tracking curve 41 at focal lengths $F_1$ and $F_2$, respectively. Herein, it is assumed that the optical path angle α is approximately proportional to the position DSH of the optical path compensation lens 14 in any focal length. As described, the controller 3 can obtain a tracking curve of arbitrary convergence angle (optical path angle $\alpha_1$) from the single constant convergence angle (constant optical path angle=$\alpha_0$) tracking curve 41.

The appropriate optical path compensation lens position $DSH_2$ calculated by the controller 3 is sent to the control units 18 of the first imaging unit 1L and the second imaging unit 1R. The drive unit 18 controls and drives the optical path compensation lens 14 so that the optical path compensation lens 14 should be moved to the position $DSH_2$ (S8).

In this manner, by processing from step S5 to step S8, the three-dimensional image pickup apparatus 100 can change the focal length f while keeping the convergence angle θ constant.

Next, the processes performed in step S9 and step S10 is explained. These steps include processes for compensating for the individual difference (deviation from the design specification) of the optical system 10. By these processes, the individual difference of the optical system 10 of the first imaging unit 1L and the optical system of the second imaging unit 1R can be compensated, and the convergence angle θ can be maintained at a high precision.

The first imaging unit 1L and the second imaging unit 1R may have their own individual differences. However, the individual difference is not taken into consideration in the tracking curve 41. Therefore, the optical path angle α may not always be correct when a control signal in accordance with the tracking curve 41 is issued.

Accordingly, the drive unit 18 modifies the constant convergence angle tracking curve 41 in consideration of the individual difference of the optical system 10. For that purpose, the drive unit 18 reads out the individual difference information held in the setting holding memory 17. The individual difference information to be read out may include, for example, correction value $R_1$. The correction value $R_1$ may be a ratio between the position $DSH_1$ of the optical path compensation lens 14 indicated by the tracking curve 41 at a certain focal length ($F_1$, for example), and the actual measured value $DSH_{1m}$ of the position of the optical path compensation lens in which the optical path angle α becomes $\alpha_0$ at the focal length $F_1$. Thus, $R_1$ is expressed as:

$$R1 = DSH_{1m}/DSH_1. \quad \text{(Equation 3)}$$

The drive unit 18 multiplies the optical path compensation lens position ($DSH_2$, for example) instructed the controller 3 by the correction value $R_1$ to compensate the individual difference of the optical system 10 (corrects the tracking curve 41). In other words, when the controller 3 sends an instruction for displacing the optical path compensation lens 14 to the position $DSH_2$, the drive unit 18 multiplies the $DSH_2$ by the correction value R1, and calculates the individual difference corrected optical path compensation lens position $DSH_2'$, and moves the optical path compensation lens 14 to the position $DSH_2'$. In this manner, the drive unit 18 modifies the position of the optical path compensation lens 14 sent from the controller 3 for compensating the individual difference (S9).

Depending on the mounting precision of the optical path compensation lens 14, a non-zero optical path angle may occur in a vertical direction V when the controller 3 sends to the drive unit 18 a control signal to move the optical path compensation lens 14 along the horizontal direction H. For example, depending on the mounting precision of the actuator of the optical path compensation lens 14, a horizontal direction of the optical path compensation lens 14 may be deviated from an actual horizontal direction H. In such a case, a movement of the optical path compensation lens 14 along the horizontal direction H is accompanied by a movement along the vertical direction V. If the optical path compensation lens 14 moves along the vertical direction V, a vertical misalignment between the left-eye image and the right-eye image captured by the first imaging unit 1L and the second imaging unit 1R may arise. The misalignment in the vertical direction between two images composing a three-dimensional image may cause a viewer to have some uncomfortable feelings. For that reason, the three-dimensional image pickup apparatus 100 performs the correction to reduce the misalignment along the vertical direction V occurred due to the individual differences of the optical systems 10.

The drive unit 18 reads out the individual difference information held in the setting holding memory 17. The individual difference information to be read out here may include, for example, correction value $R_2$. The correction value $R_2$ may be an actual measured value DSVsm of the displacement amount of the optical path compensation lens 14 in the vertical direction V while the optical path compensation lens 14 is caused to move by a predetermined displacement DSHs in the horizontal direction from the neutral position.

The drive unit 18 derives the vertical displacement DSVt necessary for canceling out the vertical shift occurred while the optical path compensation lens 14 is moved to the position $DSH_2'$ ($DSVt=-R_2 \cdot (DSH_2'/DSHs)$), and moves the optical path compensation lens 14 vertically to the vertical position of DSVt (S10).

Herein, it is assumed that the vertical displacement DSVt is proportional to the displacement of the optical path compensation lens 14 from the neutral position.

In this manner, the drive unit 18 derives the corrected value ($DSH_2'$) for the position ($DSH_2$) of the optical path compensation lens 14 sent from the controller 2, in which the individual difference is considered (S9). Next, the drive unit 18 derives the corrected value (DSVt) of the optical path compensation lens 14 as to the vertical direction V in association with the corrected value ($DSH_2'$) (S10). Thus, the individual differences in the optical path compensation lens 14 can be compensated.

While the user performs the zooming operation by manipulating the operation unit 5 ("Yes" at step S11), the three-dimensional image pickup apparatus 100 repeats the process from step S6 to step S10.

If the user turns off the power by manipulating the operation unit 5 ("Yes" at step S12), the three-dimensional image pickup apparatus 100 performs the process for turning the power off. When turning off the power, the drive unit 18 of the three-dimensional image pickup apparatus 100 stores the current position (DZ) of the variable magnification lens 12 and the current position of the optical path compensation lens 14 (DSH and DSV) in the setting holding memory 17 before the power is cut off (S13).

4. Summary

The three-dimensional image pickup apparatus 100 of the embodiment is capable of generating a three-dimensional image including the left-eye image and the right-eye image captured by the first imaging unit 1L and the second imaging unit 1R. Individually, the optical systems of the first imaging unit 1L and the second imaging unit 1R are provided with the focal length changing unit (variable magnification lens 12) and the convergence angle changing unit (optical path compensation lens 14). The three-dimensional image pickup apparatus 100 controls and drives the convergence angle changing unit based on a predetermined constant convergence angle tracking curve so as to keep the convergence angle constant before and after the focal length changing action by means of the focal length changing unit. By this the three-dimensional image pickup apparatus 100 can retain the constant convergence angle before and after the zooming operation. Further, the three-dimensional image pickup apparatus 100 can perform correction in consideration of the individual difference of the convergence angle changing unit in the course of the operation for controlling and driving the convergence angle changing unit. Accordingly, the three-dimensional image pickup apparatus 100 can retain the constant convergence angle at a high precision before and after the focal length changing operation.

If the convergence angle varies, the position of the reference plane is changed. Namely, a change in the convergence angle not intended by an operator may lead to an unexpected change in the stereoscopic effect. The three-dimensional image pickup apparatus 100 is capable of keeping the convergence angle constant before and after the zooming operation unless a user desires the change in the convergence angle. Therefore, a user can take the three-dimensional image more easily in which the stereoscopic effect that he/she intends is achieved with the three-dimensional image pickup apparatus 100.

4.1. Modified Examples

The embodiment, namely, the three-dimensional image pickup apparatus 100 is illustrated above. However, the embodiment is not limited to this example alone. Modified examples of the embodiment are described below.

As explained in the embodiment, the controller 3 holds the constant convergence angle tracking curve(s) as shown in FIG. 5 or FIG. 7, and the setting holding memories 17 of the first imaging unit 1L and the second imaging unit 1R hold the correction value(s) attributable to the individual differences. However, the controller 3 may not hold the constant convergence angle tracking curve(s). In this case, the setting holding memories 17 of the first imaging unit 1L and the second imaging unit 1R may hold the constant convergence angle tracking curve(s) and the correction value(s). In other example, moreover, the setting holding memories 17 of the first imaging unit 1L and the second imaging unit 1R may not hold the correction value(s) attributable to the individual differences. In this case, the controller 3 may hold the constant convergence angle tracking curve(s) and the correction value (s) attributable to the individual differences.

Alternatively, constant convergence angle tracking curves of the first imaging unit 1L and the second imaging unit 1R for a variety of optical path angles may be determined by actual measurement and held in the setting holding memory 17. In this case, the controller 3 may send a control signal for instructing the focal length changing operation and the controlling operation for retaining the constant convergence angle to the drive units 18 of the first imaging unit 1L and the second imaging unit 1R.

As the method for deriving the displacement (position) of the optical path compensation lens 14 to retain the constant convergence angle before and after the zoom operation, it is explained in the embodiment that the controller 3 holds a single constant convergence angle tracking curve 41. However, a plurality of the tracking curves may be held and the displacement (position) of the optical path compensation lens 14 may be derived based on the plurality of the tracking curves.

In is explained in the embodiment that the optical path compensation lens 14 is used as the convergence angle changing unit. However, any components that can alter an optical path such as a prism may be used as the convergence angle changing unit.

The three-dimensional image pickup apparatus of the present embodiment can take a three-dimensional image with a constant convergence angle before and after a zooming operation. Hence, the three-dimensional image pickup apparatus is very useful in both professional use and consumer use.

What is claimed is:

1. A three-dimensional image pickup apparatus for capturing a three-dimensional image which includes a left-eye image and a right-eye image, the three-dimensional image pickup apparatus comprising:
    a first imaging unit having a first optical system and operable to take the left-eye image;
    a second imaging unit having a second optical system and operable to take the right-eye image; and
    a controller operable to control the first imaging unit and the second imaging unit,
    wherein: the first optical system and the second optical system individually include a convergence angle changing unit capable of optically changing a convergence angle and a focal length changing unit capable of optically changing a focal length; and
    the controller, when controlling the focal length changing unit to change the focal length, controls the convergence angle changing unit based on a predetermined constant convergence angle tracking curve to keep the convergence angle constant before and after the change of the focal length.

2. The three-dimensional image pickup apparatus according to claim 1, wherein:
    the focal length changing unit is a variable magnification lens;
    the convergence angle changing unit is an optical path compensation lens; and
    the controller controls the convergence angle changing unit by deriving a position of the optical path compensation lens based on: the predetermined constant convergence angle tracking curve; a position of the optical path compensation lens before the change of the focal length; a position of the variable magnification lens before the change of the focal length; and a position of the variable magnification lens after the change of the focal length.

3. The three-dimensional image pickup apparatus according to claim 1, further comprising a storage unit operable to store information about individual difference of the first optical system and the second optical system,
    wherein the control of the convergence angle changing unit by the controller is compensated based on the information about the individual difference.

4. The three-dimensional image pickup apparatus according to claim 1, further comprising: a storage unit operable to store information for specifying a focal length set when a power is cut off last and information for specifying a convergence angle set when the power is cut off last,
    wherein the controller, when the power is turned on, controls the first optical system and the second optical system so that the first optical system and the second optical system have the focal length set when the power is cut off last and the convergence angle set when the power is cut off last.

5. A three-dimensional image pickup method in a three-dimensional image pickup apparatus including a first imaging unit having a first optical system and operable to take a left-eye image, a second imaging unit having a second optical system operable to take a right-eye image, and a controller operable to control the first imaging unit and the second imaging unit, the first optical system and the second optical system individually having a convergence angle changing unit capable of optically changing a convergence angle and a focal length changing unit capable of optically changing a focal length, the three-dimensional image pickup method comprising:
    controlling the focal length changing unit to change the focal length; and
    controlling, when changing the focal length, the convergence angle changing unit based on a predetermined constant convergence angle tracking curve to keep the convergence angle constant before and after the change of the focal length.

* * * * *